US006252631B1

(12) United States Patent
Lakhani

(10) Patent No.: US 6,252,631 B1
(45) Date of Patent: Jun. 26, 2001

(54) APPARATUS AND METHOD FOR ENCODING HIGH QUALITY DIGITAL DATA IN VIDEO

(75) Inventor: Karim Lakhani, Burnaby (CA)

(73) Assignee: AdvancedInteractive, Inc., Vancouver (CA)

( * ) Notice: Subject to any disclaimer, the term of this patent is extended or adjusted under 35 U.S.C. 154(b) by 0 days.

(21) Appl. No.: 09/152,889

(22) Filed: Sep. 14, 1998

(51) Int. Cl.[7] .......... H04N 7/00

(52) U.S. Cl. .......... 348/466; 348/465; 348/473; 348/475

(58) Field of Search .......... 348/461, 463, 348/464, 465, 466, 467, 473, 475, 476

(56) References Cited

U.S. PATENT DOCUMENTS 3,984,624 * 10/1976 Waggener .......... 348/473
3,993,861 * 11/1976 Baer .......... 348/473
4,301,470 * 11/1981 Pagany .......... 348/95
5,200,822 * 4/1993 Bronfin et al. .......... 348/473
5,278,637 * 1/1994 Naimpally .......... 348/173
5,309,235 * 5/1994 Naimpally .......... 348/476
5,659,368 * 8/1997 Landis .......... 348/476
5,663,766 * 9/1997 Sizer, II .......... 348/473
5,796,441 * 8/1998 Oshita .......... 348/476
5,946,048 * 8/1999 Levan .......... 348/473

* cited by examiner

*Primary Examiner*—Reinhard J. Eisenzopf
*Assistant Examiner*—Trang U. Tran
(74) *Attorney, Agent, or Firm*—Herbert M. Shapiro

(57) ABSTRACT

Apparatus for encoding a continuous (i.e. QAM) signal into a (non-continuous) video signal is achieved in a manner to obviate noise problems normally introduced by breaks in the (video) signal due to horizontal and vertical pulses, low fidelity circuits, timing errors and time shifts. The apparatus employs a circular First-In-First-Out buffer with an address counter. The continuous signal is samples and coded on to a active portion of a video line and an address pointer in the address counter is adjusted back a given number of samples at the end of the video line. On the next video line, that (adjusted) number of samples (from the previous line) are output from the buffer before new data is output. By adjusting the number of samples and adding extra samples to the next video line, noise problems are virtually eliminated.

16 Claims, 5 Drawing Sheets

APPARATUS AND METHOD FOR ENCODING HIGH QUALITY DIGITAL DATA IN VIDEO

FIELD OF INVENTION

This invention relates to apparatus for encoding a modulated signal on to the active part of a horizontal line of a video signal.

BACKGROUND OF THE INVENTION

U.S. Pat. No. 5309235, issued May 3, 1994, to Saiprasad V. Naimpally, and entitled "System and Method for Transmitting Digital Data in the Overscan Portion of a Video Signal", discloses a method of encoding quadrature amplitude modulation (QAM) signals in the overscan portions of the horizontal line of a video signal. Furthermore, the patent describes a technique to overcome the problem of ringing by doubling the symbols at each of the edges of the signal encoded in the video signal. At the receiver the added symbols are removed. This requires some extensive circuits at the receiver to discard the added symbols. It also does not overcome the problem of time shifts caused by various components in the system.

The standard technique in the industry to solve the problem of timing and synchronization is to provide a clocking sequence at the start of the line followed by a framing byte. Again, utilizing this technique requires additional circuits at the receiver to recover the clocking pulses and to synchronize to the framing byte. Further, there needs to be a way of transiting from a digital signal to an analogue signal and not having transient noise problems at the boundaries. Such problems are obviated by techniques in accordance with the principles of this invention. The doubling of symbols at the edges of the signal works when all the apparatus used have high fidelity and precise timing and the video waveforms are reproduced without distortion. Otherwise, the recovered signal will have noise causing numerous errors when the data encoded in the signal is recovered. The decoder also needs complicated circuit to discard the repeat symbols. The repeat symbols at the edges of the signal do not solve the time shifts and limited bandwidth of the receiving apparatus problems. The above problems end up in the system as noise. The circuitry at the decoder is also complicated due to the need to discard the repeat symbols.

BRIEF DESCRIPTION OF THE INVENTION

The noise presently introduced by prior art techniques for encoding a continuous analogue (i.e. QAM) signal into a video signal is avoided by copying a preset number of samples (Y) at the end of one video line and adding the copied samples (Y) to the beginning of the next encoded video line in a sense widening the line. The samples are generated by digitizing the video signal and the noise is generated partially by horizontal and vertical sync pulses which determine the sequence of video lines. The addition of extra samples on the encoded video line in accordance with this invention and not decoding the extra samples eliminates such noise.

DETAILED DESCRIPTION OF AN ILLUSTRATIVE EMBODIMENT OF THIS INVENTION

A QAM signal is a continuous analogue signal modulated by digital data. A video signal has horizontal and vertical sync pulses which break up the video signal and render it non-continuous. In accordance with the principles of this invention, the coding of a continuous signal (i.e. QAM) onto a non-continuous signal (i.e. video signal) is carried out in a manner which does not add noise or timing distortions into the continuous signal when the signal is decoded.

Figure 1:
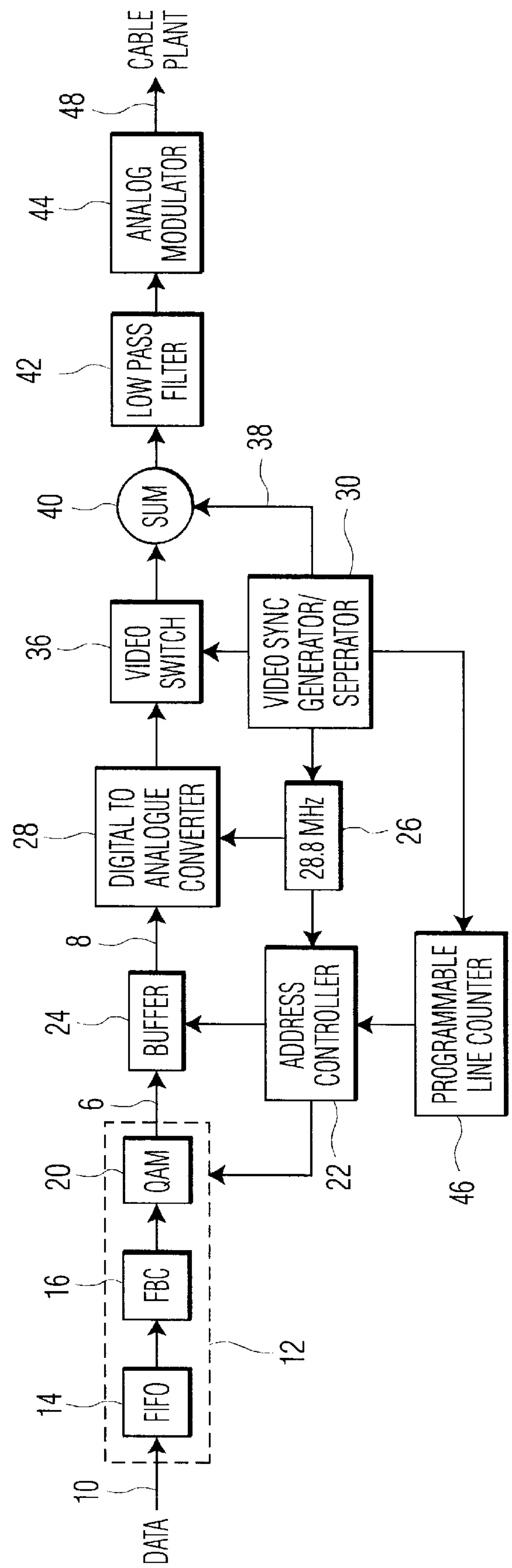
FIG. 1. is a block diagram of an apparatus for encoding a QAM signal in the video signal in accordance with the principles of this invention.

In FIG. 1 digital data enters circuit 12 from a source not shown at arrow 10. The source of digital data may originate from a microcomputer, floppy disk drive, hard disk drive, network, or a multitude of similar known sources. The data enters circuit 12 which could be a commercially available QAM Encoder such as L64767 "DVB SMARTV QAM Encoder" from LSI Logic Inc. Not all the modules in the L64767 are shown. Only the parts relevant to the description of this invention are shown. All the modules in the part interact as per the description of the manufacturer.

The data enters the Circular First-In-First-Out (FIFO) buffer 14 which decouples the input data rate from the transmission data rate. The output of Circular FIFO buffer 14 enters the Forward Error Correction (FEC) circuit 18, which is one of the module inside the L64767. The output of the FEC circuit 18 enters the quadrature amplitude modulator (QAM) encoder 20 which produces the QAM channel output. The QAM outputs of the QAM encoder is input to Buffer 24.

The output of Buffer 24 is input to a Digital to Analogue (D/A) converter 28. The data output of Buffer 24 is controlled by Address Controller 22. The operation of Buffer 24 is similar to a First-In-First-Out (FIFO) buffer except the address controller can replay some of the data in the Buffer 24 on the output. The purpose of the ability to replay will become apparent hereinafter. The output of D/A converter 28 is fed into a Video Switch 36. The operation of Video Switch 36 is controlled by Video Sync Generator/Separator 30. The output of Video Switch 36 is input to the Summing Amplifier 40. The second input of the Summing Amplifier 40 is from Video Synch Generator/Separator 30. The Video Sync Generator/Separator could be of a type that generates a video signal or of a type that takes a reference video signal and synchronizes to the reference signal.

The output of the Summing Amplifier 40 is fed into a Low Pass Filter (LPF) 42. The output of LPF 42 is a composite video signal. This composite video signal is similar to any other television signal. The composite video signal may be recorded on a video tape recorder or it could be processed by other video equipment such as time base corrector before it reaches the input of Analogue Modulator 44. In this particular embodiment, the output of the summing amplifier is fed into an Analogue Modulator 44. Any equipment in-between the LPF 42 and Analogue Modulator 44 is not shown. The output of the Analogue Modulator 44 is fed into a typical cable head for delivery to televisions and set-top boxes on the cable network. The output of the Analogue Modulator 44 could equally as well be the input to a Television transmission antenna or a Microwave System, or a Satellite Link.

Figure 2:
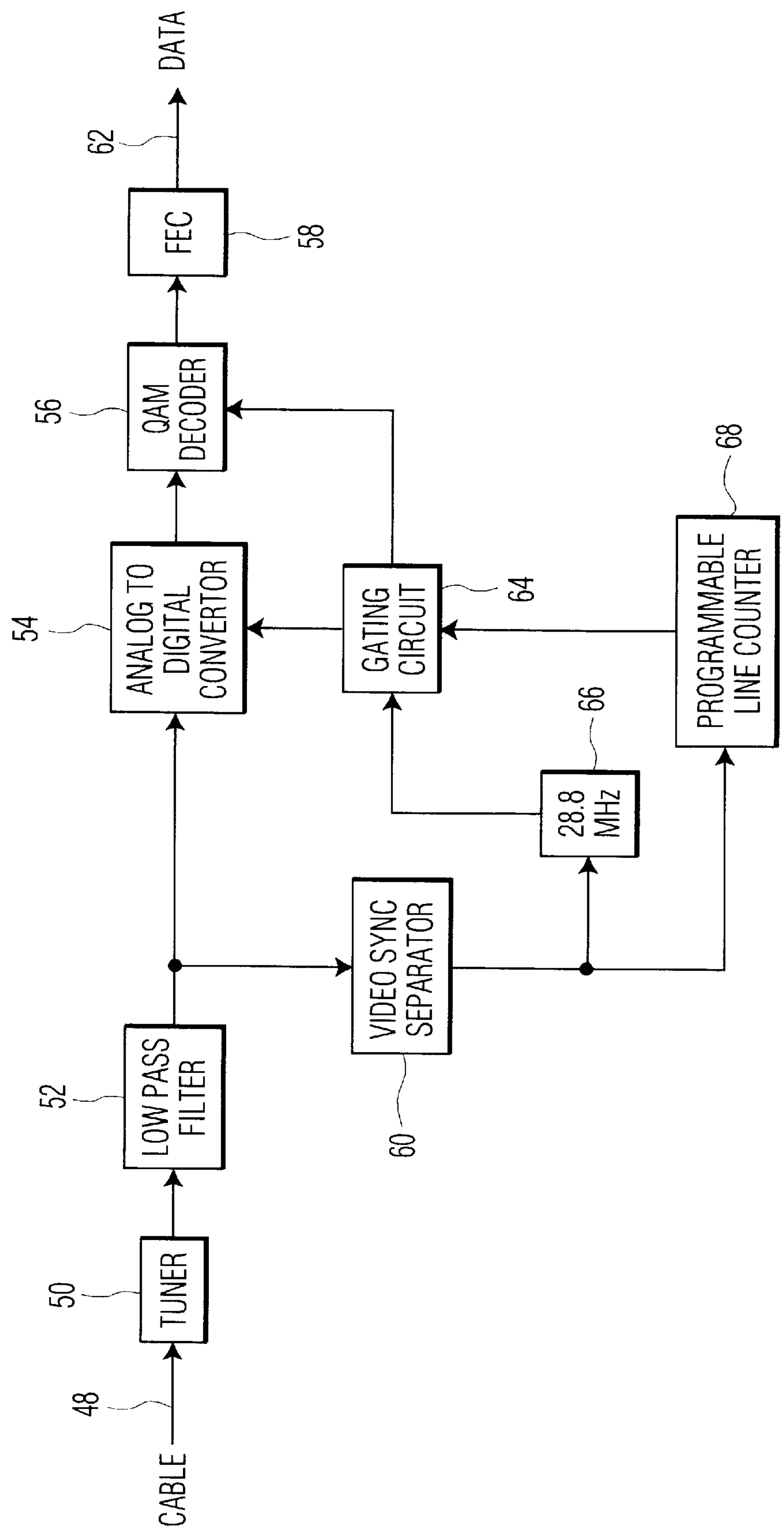
FIG. 2. is a block diagram of an apparatus for decoding a QAM signal encoded in the video signal in accordance with the principles of this invention.

FIG. 2 show a circuit to decode the QAM signal encoded in the video using the circuit of FIG. 1. The input to Tuner 50 is the signal 48 that was coded with the circuit of FIG. 1. Tuner 50 tune's to the same channel as the output of Analogue Modulator 44 of FIG. 1. Signal 48 does not have to originate at the cable head. It could very well be a regular broadcast video signal, a microwave broadcast, a satellite broadcast etc. The output of the Tuner 50 is a base band video signal. The signal enters the Low Pass Filter (LPF) 52. The output of the LPF 52 is fed into an analogue to digital (A/D) converter 54. The output of the A/D converter 54 is fed into a QAM Decoder 56. QAM Decoder 56 may be a kind such as the L9A0054 QAM demodulator available for LSI LOGIC Inc. The output of the QAM demodulator 56 is fed into a Forward Error Correction (FEC) Module 58. The FEC Module 58 could be a commercial devices such as the L64705 from LSI LOGIC Inc. The output of FEC module 58 is the original data 10 of FIG. 1.

The output of the LPF 52 is also fed into a video sync separator 60. The horizontal and vertical pulses from the video sync are fed into a Gating Circuit 64. The operation of A/D Converter 54 and QAM Decoder 56 are controlled by Gating Circuit 64. The operation of the Gating Circuit 64 and it operation of A/D Converter 54 and QAM Decoder 56 will be explain hereinafter.

The input to and output from QAM Encoder circuit 12 (of FIG. 1) are well know to people versed in the art. The digital output of QAM Encoder circuit 12 is fed into a Buffer 24. Address Controller 22 controls the operation of Buffer 24. At the start of the active portion of horizontal line 72 (of FIG. 3) approximately 10.48 microseconds after the fall edge of the horizontal pulse 70, the output of the Buffer 24 is enabled (76). In this illustrative case, the sampling frequency is 28.6 MHz or 8 times the color burst signal for an NTSC signal. The output of Buffer 24 is disabled at approximately 50.286 microseconds after the start (78). The end of the output D/A converter 28 is shown on FIG. 3 as 74. In total, 1440 samples are output from Buffer 24 in a time period of 50.286 microseconds at a sampling frequency of 28.6 MHz.

The output address pointer in the Address Counter 22 is then moved back by 48 (Y) samples. On the next horizontal video line, the last 48 (Y) samples of the previous lines are output from Buffer 24 before 1388 (X) new data samples are output from Buffer 24. At the Decoder, the Gating Circuit 64 (FIG. 2) enables the A/D converter 54 at approximately 12.156 microseconds after the falling edge of horizontal pulse (70 in FIG. 3). This is 32 (V) samples after the start of the enabling of the encoder 76. Gating Circuit 64 disables the A/D converter 54 after sampling 1388 (X) samples. This is 16 (W) samples before the end of the output of the encoder 74. Due to the repeating of data from one line to the next effectively only 1388 (X) new data samples are encoded on each horizontal line. There are in-effect 32 (V) guard samples at the start of the line and 16 (W) guard samples at the end of the line. The total number of guard samples on a line is 48 (Y). Gating Circuit 64 controls the QAM Decoder 56 in a similar way as to A/D converter 54.

The numbers and frequencies utilized above are for an NTSC system but the same technique can be applied to a PAL, SECAM or other video signal formats with appropriate changes in the frequencies and number of guard sample per line. Those versed in the art would be able to adapt this invention to the other signal formats based on the description supplied herein.

The Programmable Line Counter 46 (of FIG. 1) can be programmed to enable the QAM signal to be encoded on any video line. It may be programmed to output the QAM signal on line 10 to line 262 of the each field or it may be programmed to output on lines 10 to 20 only in each field. The choice of which lines to encode with the QAM signal is based on the user's preference.

The circuit of FIG. 1. may be modified to insert the QAM signal on only some of the lines of an incoming video signal. A normal broadcast video signal would be used where the vertical blanking lines alone would be coded with the QAM signal in accordance with the principles of this invention. At the receive end, the user would get the full video picture plus the QAM signal encoded in the vertical blanking period of the video signal, in effect receiving the existing picture plus a high data rate digital signal coded in the vertical blanking period. The Programmable Line Counter 68, (of FIG. 2) may also be programmed to decoded the QAM signal on line 10 to line 262 of each field or it may be programmed to decode on lines 10 to 20 of each field. The encoder and the decoder are programmed to work in sync. The decoder would only decode the lines that are encoded by the encoder.

Figure 3:
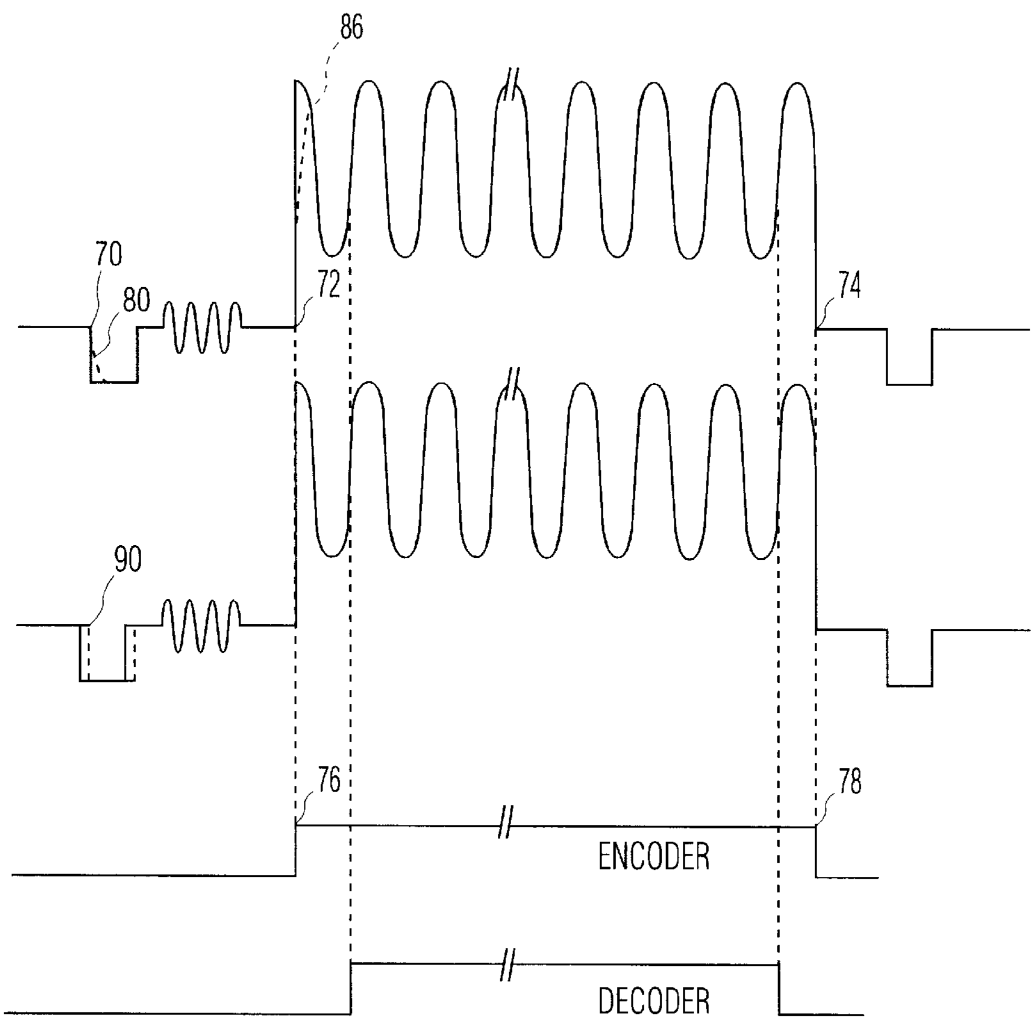
FIG. 3. is a waveform diagram showing two of the video lines encoded with the apparatus of FIG. 1.

At the start of the active part of the horizontal line 32 (V) guard samples are added to guard against the limited frequency response of receiving equipment. The dotted line 86 in FIG. 3 shows the delay curve for a signal to reach the steady state amplitude. The signal at the receiving equipment does not react like a vertical line 72 but more line the dotted line 86 shown. The vertical response line would be the ideal case but is only possible in very high fidelity equipment that have a very high bandwidth frequency response. The 32 (V) guard samples at the start of the line allow the incoming signal on the receiving equipment to reach a valid value before it is decoded by the decoding circuit. In effect making the transient response of the receiving equipment the equivalent of reproduction equipment of very wide bandwidth. It will be noted that the inadequate performance of the typical reproducing equipment is overcome at the recording equipment by the addition of the guard samples. The cure is inherent with the video signal format and does not require any adjustment upon reproducing the program material.

In the normal processing of video signals for editing or for transferring from one recording medium to another, typically time-base correctors and video processor amplifiers re-insert new sync signals to assure conformance to television waveform format specifications. The inserted sync signal typically differs slightly in timing in relation to the samples on a video line as compared to the original sync signal. An example of this is shown by the dotted line 90 of FIG. 3. This is within the limits of television specifications, but may be more than the width of a few samples.

The guard samples at the start of the line should be a minimum of the worst case rise time for a signal to reach the maximum amplitude plus the worst case horizontal pulse fall time delay plus the delays caused by time base correctors present between the encoder and decoder. One to two additional guard samples also are preferably added to account for other small timing errors caused by the limited frequency response of the circuits between the encoder and decoder. An example of the horizontal pulse fall time delay is shown in FIG. 3 as a dotted line 88.

The 16 (W) guard samples at the end of the line are used to guard against the timing shifts due to falling time delay of the horizontal pulse and the delays caused by devices such as the time base correctors plus delays caused by other circuits in between the encoder and decoder. Without the guard samples at the start and the guard samples at the end of the line, the shifted sample timing resulting from typical video processing may result in noise when recovering the original QAM signal encoded on the video line. The noise translates into data errors out of the QAM decoder.

The recovery process in the illustrative embodiment, utilizes a 28.6 MHz sampling clock, which is synchronized by the video line sync signal. After delaying an appropriate number of cycles for the synchronizing interval, the sampling begins at the nominal time-center of the first sample on the line. If the sample video had been shifted by more than one-half sample interval (18 nanoseconds) the first recovered sample would have occurred in the line sync interval "back porch" or "front porch" area. Rather than sampling the QAM encoded signal, the recovery process would have sampled video black, which is a full scale QAM value. This introduces noise at the receiver which results in errors in the recovered data. Addition of the guard samples at the start of the video line and the guard samples at the end of the line during the formation of the video signal reduces the susceptibility to line time-shifts as described above.

QAM Encoder 12 of FIG. 1 is programmed such that the maximum signal output frequency is limited to 4 MHz. This is to insure that the QAM output signal can be contained within the bandwidth limit of the video signal. The circuits of FIG. 1 and FIG. 2 may be operated over sampling frequencies of 2, 4, 6 or 8 times. The over sampling mode of operation would create a higher quality signal but in no way change the overall concept of the invention. The buffer sizes and components speeds would have to be increased to work at the higher frequencies.

The circuits of FIG. 1 and FIG. 2 show an illustrative QAM encoder and QAM decoder. An QPSK, π DPSK, or other modulating encoder/decoder that require a digital data modulated signal could also be used. The illustrative embodiment demonstrates a technique of effectively coding a continuous digital data modulated signal into non-continuous video signal and recovering the signal at the receiver and recreating the continuous digital data modulated signal without the problems caused due the discontinuities of the encoded signal. It also demonstrates that the time shift problems introduced by the video processing equipment are obviated. This particular technique also over comes the problem of the commercial QAM Decoder requiring approximately 100 milliseconds to synchronize to the incoming signal. The commercial QAM decoder in this particular case "sees" a continuous digital data modulated signal. It does not see the discontinuities present in the video signal. It thereby allows a low cost commercial QAM decoder to be used for decoding the QAM signal.

The QAM Encoder of FIG. 1 could easily be implemented by a software QAM Encoder and the QAM Decoder of FIG. 2 could easily be implemented by a software QAM Decoder. The Buffer 24, Address Controller 22, and Programmable Line Counter 46 could easily be implemented by software. The technique in accordance with this invention still applies.

A typical clock frequency for video signals is 28,636,360 Hz. An optimum active length for a video line is 50.286 microseconds. This equates to 1440 samples. The first sample starts 10.48 microseconds after the falling edge of the horizontal sync pulse. The time lag for the fall of the horizontal sync pulse can be as much as 250 nanoseconds. Each sample is 34.920639 nanoseconds. The worst case rise time can be as much as 550 nanoseconds for a signal to reach maximum amplitude. In a studio environment where there are time base corrects and similar equipment, they shift the horizontal sync pulse relative to the active video signal. This could be as much as 300 nanoseconds. In this context, the maximum number of samples effective at the start of the line would be 250+550+300=1100 nanoseconds or 32 samples. At the end of the line we have the time delay due to the falling edge of the horizontal sync pulse plus the time shift due to the time base correctors and similar equipment only. Therefore, the total number of samples required to guard against all the above potential problems would be 32 (V)+16 (W)=48 (Y) samples. On an active video line a total of 1440 (Y+X) samples are encoder, 48 (Y) repeat samples plus 1388 (X) new samples.

Figure 4:
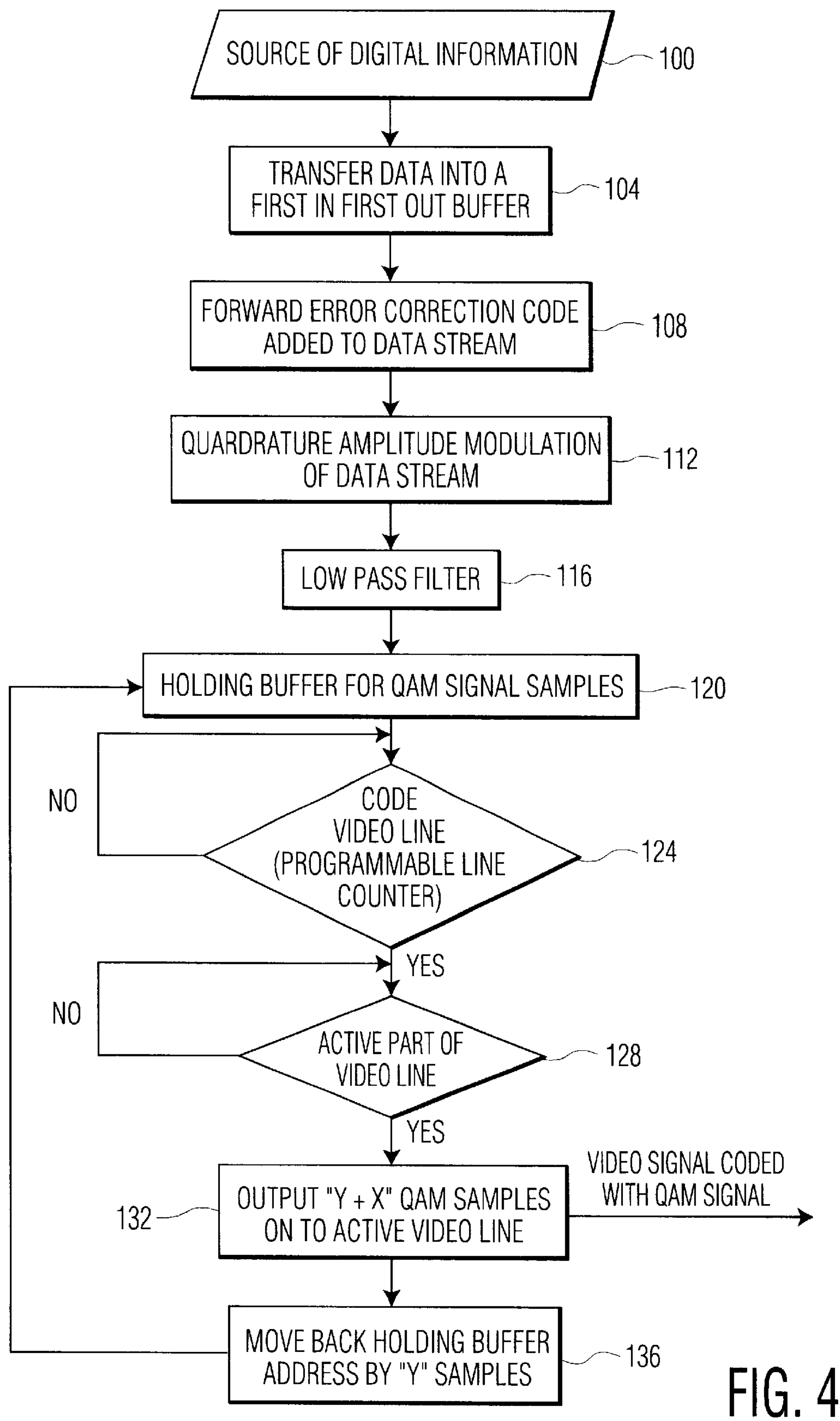
FIGS. 4 and 5 are flow charts illustrating the methods of coding and decoding QAM signals on a video signal respectively.

FIG. 4 is a flowchart that shows the method step for encoding a QAM signal into a video signal. At Step 100 we have a source of digital information. This information can originate from a hard disk, a network connection or a multitude of other digital sources. The information at Step 104 is transferred into a First In First Out buffer which allows the input data rate to be de-coupled from the transmission data rate. The output of the First-In-First-Out buffer is fed into to a Forward Error Correction (FEC) module in Step 108. This module computes the forward error correction code and adds it to the data stream. In Step 112 the data steam is then fed into a Quardrature Amplitude Modulator that outputs a Quardrature Ampliture Modulated sampled stream. In Step 116 this stream is fed into a low pass filter. The low pass filter filters the samples and outputs them to a holding buffer (Step 120). Step 124 represents a user programmable line counter to enable the encoding of a QAM signal on to specific lines of a video frame. The programmable line counter could be programmed to enable coding on say lines 10 to 20 of the video frame. At Step 124 the system waits for the programmable line counter to provide the signal to code the video line. At Step 128 the system waits until the start of the active video line. At Step 132 1440 samples from the holding buffer are encoded onto the active portion of the video line. The video is now coded with a QAM signal and can be transmitted. At Step 136 the holding buffer address is moved back by 48 (Y) samples. The 48 (Y) samples coded at the end of the present line will be coded again at the beginning of the next line followed by 1388 (X) new samples from the holding buffer coded on the next line.

Figure 5:
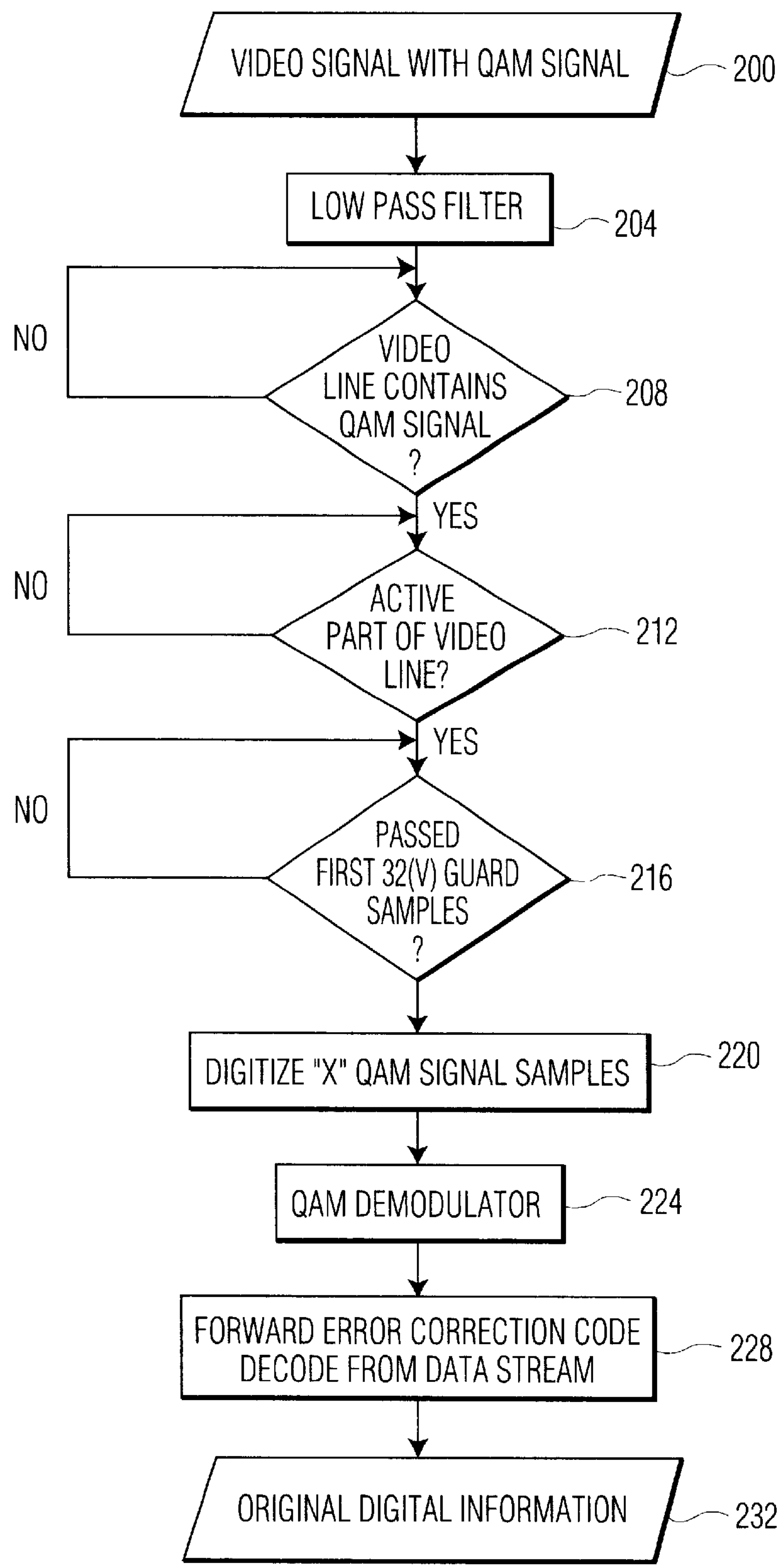

FIG. 5 is a flowchart showing the method step of decoding a QAM signal coded on to a video signal by the method steps of FIG. 4. The video signal from Step 132 of FIG. 4 is received at Step 200. It is low pass filtered at Step 204. At Step 208 the system waits till a video line coded with a QAM signal is received. This process is controlled by a user-programmable line counter similar to the user-programmable line counter in the encoder portion of the system. At Step 212 the system waits until the active portion of the video line is received. At Step 216 the system waits until the first 32 (V) guard samples have passed. At Step 220 the digitizer is enabled for 1388 (X) samples. The 16 (W) guard samples at the end of the video line are not digitized at the decoder. The 1388 (X) digitized samples are fed into the QAM decoder at Step 224, where they are demodulated and the data output stream containing the original data stream along with the FEC code is output to FEC decoder at Step 228. The output of FEC decoder (Step 232) is the original data stream that was entered into Step 100 of FIG. 4.

The FEC coding step could be removed at the encoder and the decoder and the system would still continue to operate. The FEC Step 228 adds the capability of correcting the data at the receiving end if there were errors introduced in the signal during transmission. The FEC Step 228 could be replaced with a method step of adding just check bits that can be utilized at the receiver to check for the validity of the received data.

It is clear that, in accordance with the principles of this invention, apparatus for encoding a continuous (e.g. QAM) signal into a (non-continuous) video signal is achieved in a manner to obviate noise problems normally introduced by breaks (i.e. non continuity) in the video signal due to horizontal and vertical sync pulses, low fidelity circuits, timing errors and time shifts. The apparatus employs a circular First-in-First-Out buffer and an address counter. The continuous signal is sampled into the buffer and an address counter for the buffer is adjusted back a given number of samples (Y) to encode a large number of samples (Y+X) on to a video line at the transmitter than is decoded (X) at the receiver. The output of the buffer is then enabled in effect outputting (Y) samples from the buffer that were previously output from the buffer on the previous line before (X) new samples from the buffer are output on the next line. The adjusted samples provide for (V) guard samples at the start of the line (W) guard samples at the end of the video line since at the receiver the decoding of the samples is delayed by V samples at the start of the line and W samples at the end of the line. The V samples at the start of the line and the W samples at the end of the video line virtually eliminated the noise problems caused by the breaks in the video signal.

What is claimed is:

1. Apparatus for encoding a continuous digital data modulated signal onto the active portion of video lines, said apparatus including means for coding Y+X digital modulated signal samples per video line, said apparatus including means for copying Y samples from the end of a first video line, said apparatus also including second means for coding Y samples from the end of said first video line to the beginning of a second video line thereafter followed by X new samples.

2. Apparatus as in claim 1 wherein said first means comprises a circular First-in-First-Out buffer and an address counter including an address pointer.

3. Apparatus as in claim 2 including means for moving said pointer back to output Y samples that have previously been output from the buffer.

4. Apparatus as in claim 1 also includes means for individually programming each video line with a digital data modulated signal.

5. Apparatus as in claim 1 also includes a means for transmitting said encoded video signal.

6. Apparatus as in claim 5 including means for receiving said video signal, means for sampling X samples per video line, and means for assembling the original continuous digital data modulated signal.

7. Apparatus as in claim 6 including QAM decoder means for decoding a digital data modulated signal.

8. Apparatus as in claim 7 including means for recovering the original data.

9. Apparatus for encoding a continuous digital data modulated signal onto consecutive lines of a non-continuous video signal sampled at X samples per line, said apparatus including a first-in-first-out buffer and an address pointer, said apparatus including means for sampling said continuous signal into said buffer, said apparatus also including means for setting said address pointer such that a preset number Y of samples of said continuous signal are copied from the end of a stream of samples transmitted with a first line of said video signal and for adding that preset number Y of samples to the beginning of a later line of said video signal, and means for encoding Y+X samples on to a video line.

10. Apparatus as in claim 9 including means for transmitting said video signal.

11. Apparatus as in claim 10 including means for receiving said video signal, including means for sampling video signal at a rate of X samples per line, said apparatus including a means for assembling said original digital data modulated signal, and means for decoding said digital data modulated signal.

12. Apparatus for decoding video lines on which is coded a continuous digital data modulated signal in accordance with claim 1, said apparatus including means for decoding only X samples per video line, second means for forming the original continuous digital data modulated signal.

13. A method for encoding a continuous digital data modulated signal on to the active portions of video lines where the video lines are separated by synchronizing pluses, said method comprising the steps of coding Y+X samples of the continuous digital data modulated signal on the active portion of a video line, copying Y samples from the presently coded line and coding on the next coded video line the Y samples from the previously coded line followed by X new samples from the digital data modulated signal.

14. A method for decoding a continuous digital data modulated signal encoded into consecutive video lines of a non-continuous video signal as in claim 13, said method comprising the step of only sampling X samples of the total X+Y samples coded on the video line.

15. Apparatus for communicating digital information, comprising;

a) a source of digital information, b) a quardrature amplitude signal (QAM) encoder, c) a means for placing sampled QAM signal into a holding buffer, having an address counter and address pointer, d) a source of standard video signal waveform, e) a programmable video line counter, f) a means of coding Y+X sampled QAM signal samples upon the lines of video signal, g) means of moving back the address pointer of said buffer by a pre-selected Y number of samples after the code of each video line, h) means for transmitting said video signal, i) means for receiving said video signal, j) means of sampling video signal, k) means for assembling a sampled QAM signal, l) means for decoding the sampled QAM signal to recover the original source of digital data.

16. Apparatus as in claim 15 including means for adding forward error correction code for verification coding and correcting errors to digital information.

* * * * *